United States Patent [19]
Scher
[11] 4,046,741
[45] Sept. 6, 1977

[54] POST-TREATMENT OF POLYUREA MICROCAPSULES

[75] Inventor: Herbert B. Scher, Moraga, Calif.
[73] Assignee: Stauffer Chemical Company, Westport, Conn.

[21] Appl. No.: 658,212
[22] Filed: Feb. 17, 1976
[51] Int. Cl.[2] ........................ C08G 18/82; B01J 13/02; B05D 7/24
[52] U.S. Cl. ................................ 260/77.5 A; 252/316; 260/2.5 A; 260/2.5 BD; 260/29.2 TN; 260/75 NA; 260/75 NE; 260/77.5 CH; 260/77.5 SS; 427/212; 427/214; 427/222; 528/490
[58] Field of Search ...... 260/75 NE, 77.5 A, 77.5 SS, 260/29.2 TN, 2.5 A, 2.5 BD, 77.5 CH, 75 NA; 427/212, 214, 222; 252/316

[56] References Cited

U.S. PATENT DOCUMENTS

| | | | |
|---|---|---|---|
| 2,888,408 | 5/1959 | Rogers et al. | 260/2.5 BD |
| 3,264,089 | 8/1966 | Hansen | 427/212 |
| 3,409,461 | 11/1968 | Mehlo et al. | 117/100 |
| 3,577,515 | 5/1971 | Vandegaer | 260/29.2 TN |
| 3,655,627 | 4/1972 | Hutzler et al. | 260/77.5 A |
| 3,900,669 | 8/1975 | Kiritani | 252/316 |

OTHER PUBLICATIONS

Saunders et al., Polyurethanes, Part I, Interscience, N.Y., (1962), p. 65.

*Primary Examiner*—H.S. Cockeram
*Attorney, Agent, or Firm*—Harry A. Pacini

[57] ABSTRACT

Post-treatment of microcapsules having polyurea walls with ammonia or amines to reduce the residual isocyanate level and modify permeability of the microcapsule wall. Flowable formulations of the polyurea microcapsules then can be stored at pH values below 8 without generating carbon dioxide from the reaction of residual isocyanate groups with water.

9 Claims, No Drawings

POST-TREATMENT OF POLYUREA MICROCAPSULES

BACKGROUND OF THE INVENTION

This invention relates to post-treatment of polyurea microcapsules with ammonia or amines to reduce the residual isocyanate level. Reduction of the residual isocyanate level, which results from the process in which the microcapsules are formed, permits flowable formulations of the microcapsules to be stored at pH values below 8 without the generation of carbon dioxide gas. Microcapsules are prepared by the process, in which polyurea capsule enclosures are formed around water-immiscible material by the interfacial polymerization of an organic isocyanate intermediate with water in the aqueous phase. The generation of carbon dioxide gas occurs when residual or unreacted isocyanate groups present after processing react with water in storage.

This invention also relates to post-treatment of polyurea microcapsules with ammonia to modify the permeability of the microcapsule wall. Modification of the permeability of the microcapsule wall is important to successful employment of the capsule and ultimately the material encapsulated therein. A high degree of cross-linking in the microcapsule wall can cause low permeability of the core material through the wall and affect the usefulness of the resulting capsule. A high degree of cross-linking can result from the use of di- and tri-functional monomers in the preparation of the polyurea microcapsules. With certain materials, a highly cross-linked wall structure is undesirable since it directly affects permeability of the core material to an adverse extent. To overcome the problem raised by the increased cross-linking, it has been found that the permeability of the resultant capsule wall can be modified by the post-treatment of the capsule wall with ammonia or an amine.

Post-addition of ammonia or amines to polyurea microcapsules reduces the residual isocyanate level in these capsules. Said addition modifies the permeability of the microcapsule wall to the core material and allows the formulation to be stored at pH values below about 8 without carbon dioxide generation.

More particularly, this invention relates to the production of improved polyurea microcapsule formulations containing the various core materials by the post-treatment of the formed polyurea microcapsules with ammonia or amines to rėduce residual isocyanate levels. This improvement results in the ability to store flowable formulations of the microcapsules described herein at pH values below 8 without the generation of unacceptable carbon dioxide pressures in the sample containers. The process of this invention is directed to the production of improved microcapsule formulations, wherein the residual isocyanate level in the polyurea walls is reduced such that the generation of carbon dioxide is minimal, such process involving the post-treatment of said polyurea microcapsules with ammonia or amines.

More particularly, this invention relates to the production of improved polyurea microcapsule formulations containing various core materials by the post-treatment of the formed polyurea microcapsules with ammonia to modify the permeability of the capsule wall. This improvement results in a means for modifying the permeability of a polyurea microcapsule wall to achieve desired permeability. Post-treatment after the formation of the polyurea microcapsules with ammonia limits the cross-linking.

Reference is hereby made to Belgian Pat. No. 796,746, assigned to Stauffer Chemical Company, published Sept. 14, 1973. The aforementioned patent describes a method for encapsulating various water-immiscible materials employing an organic isocyanate intermediate to form a polyurea capsule enclosure around a water-immiscible material dispersed in an aqueous continuous phase.

Capsules of the nature and description disclosed hereinabove have a variety of uses, such as for containing dies, inks, chemical reagents, pharmaceuticals, flavoring materials, fertilizers, fungicides, bactericides, pesticides, such as herbicides, insecticides and the like, which substances can be dissolved, suspended or otherwise dispersed in or as the core material to be enclosed in the capsule. The material to be encapsulated can be employed in the initial dispersion at a temperature above its melting point, or dissolved or dispersed in suitable water-immiscible organic solvents. The nature of the water-immiscible material to be encapsulated can be organic or inorganic in nature. Once encapsulated, the liquid or other form is preserved until it is released by some means of instrumentality that breaks, crushes, melts, dissolves or otherwise removes the capsule skin, or until released by diffusion is effected under suitable conditions. An important specific aspect of this invention, together with other features and advantages contemplated by the invention, is the novel method for post-treatment of the poly-urea microcapsules formed by the above process with ammonia or amines to reduce the residual isocyanate level, thereby allowing storage of said microcapsules at pH values below 8.

Effective encapsulation by interfacial polymerization by an organic isocyanate intermediate can be accomplished in a process which utilizes two substantially immiscible liquids, one termed an aqueous phase and the other termed an organic phase, which comprises establishing a physical dispersion of the organic phase in the aqueous phase. Said organic phase contains the isocyanate intermediate for the polyurea capsule skin or enclosure. The interfacial polymerization, as it is termed, involves hydrolysis of an isocyanate monomer to form an amine which in turn reacts with another isocyanate monomer to form the polyurea enclosure. Capsules formed in this manner can range in size from about 0.5 microns to about 100 microns.

Isocyanates are capable of forming carbon dioxide gas by reaction with water in acidic solutions. In the above-described process, there remains unreacted isocyanate groups which in the presence of water are capable of forming carbon dioxide gas. When being stored, the microcapsules containing residual isocyanate, unless stored in the basic pH range, are capable of generating sufficient quantities of carbon dioxide to produce dangerous situations of pressure build-up and the like. Similarly, for certain materials, storage of the microcapsules containing the materials at pH ranges considered basic is not desirable since these microcapsules stored at pH values above about 7 will undergo hydrolytic decomposition. The post-treatment of the present invention is particularly useful for polyurea microcapsules of methyl parathion and the organic phosphate insecticideacaricide having as its active ingredient the compound N-(mercaptomethyl) phthalimide S-(O,O-dimethyl phosphorodithioate).

SUMMARY OF THE INVENTION

This invention relates to the post-treatment of microcapsules having polyurea walls with ammonia or amines to reduce the residual isocyanate level and to modify permeability of the microcapsule wall.

Therefore, it is an object of the present invention to provide a novel post-treatment process for polyurea microcapsules which produces polyurea microcapsules capable of being stored at pH values below 8 without generation of undesirable pressures of carbon dioxide gas.

It is another object of this invention to provide a novel system of post-treatment for microcapsules with polyurea walls having improved storage capabilities at pH values below 8.

It is another object of this invention to provide a novel system of post-treatment for polyurea microcapsules to modify the permeability of the polyurea microscapsule wall.

It is another object of this invention to modify the permeability of polyurea microcapsule by post-treatment after formation of the wall to enhance the utility of the formulation.

Other objects of this invention will be apparent to those skilled in the art by reading the instant specification.

The above objects have been achieved by post-treatment of microcapsules having polyurea walls with ammonia or amines to reduce residual isocyanate levels therein and modify the permeability of the microcapsule walls. Conversely, flowable formulations of the polyurea microcapsules can thereby be stored at pH values below 8 without generating carbon dioxide. Said carbon dioxide forms from the reaction of residual isocyanate groups with water. Modified polyurea microcapsule walls allow enchanced properties to be imparted to the microcapsule formulation by limiting the degree of cross-linking in the wall structure. Accordingly, the basic microencapsulation process for forming the polyurea microcapsules is as described in Belgian Pat. No. 976,746, supra; however, it has been found that by the post-treatment of said microscapsules, improved flowable formulations for storage at pH values below about 8 are obtained and with modified permeability of the microcapsule wall.

Suitable post-treatment of the polyurea microcapsules can take place in the original reaction vessel without separation or further handling. Post-treatment to reduce the residual isocyanate level or to modify the permeability of the microcapsule wall can be effected with ammonia or an organic dialkylamine wherein said alkyl groups each contain from 1 to 6 carbon atoms, inclusive. That is, for example, said dialkylamines as dimethylamine, diethylamine, dipropylamine, dibutylamine and dihexylamine.

Within the preferred practice of the present invention, core material can be effectively microencapsulated by interfacial polymerization of an organic isocyanate intermediate in a process which utilizes two substantially immiscible liquids, one termed an aqueous phase and the other termed an organic phase, and the other termed an organic phase, and which comprises establishing a physical dispersion of the organic phase in the aqueous phase. Said organic phase containing the organic isocyanate intermediate for the polyurea capsule skin or enclosure, and the active ingredient or core material.

The interfacial polymerization to form the capsular walls involve hydrolysis of an isocyanate monomer to form an amine which in turn reacts with another isocyanate monomer to form the polyurea enclosure. The addition of no other reactant is required once the dispersion establishing droplets of the organic phase within a continuous liquid phase, i.e. aqueous phase, has been accomplished. Thereafter, and preferably with moderate agitation of the dispersion, formation of the polyurea capsule skin or enclosure around the dispersed organic droplets is brought about by heating the continuous liquid phase or by introducing a catalytic amount of a basic amine or other reagent capable of increasing the rate of isocyanate hydrolysis, such as tri-n-butyl tin acetate, optionally in addition adjusting the pH of the dispersion, thereby effecting the desired condensation reaction at the interface between the organic droplets and the continuous phase.

In the manner described hereinabove, fully satisfactory, discrete microcapsules are formed having a skin or outer wall consisting of polyurea produced by the reaction and containing the encapsulated core material. Within the process of the invention, the reaction which forms the skin or enclosure of the capsule, generally is complete. However, oftentimes unreacted polyisocyanate remains as residual poyisocyanate. It is under these conditions that upon storing, especially at pH values less than about 8, there is substantial generation of carbon dioxide gas. Within the process of the invention, modification of the permeability of the capsule wall is desirable by post-treatment with ammonia.

Generally, the process of the instant invention involves holding the microcapsule dispersion at about 50° C. for approximately 3 hours. The polyurea microcapsule dispersion is then treated with a quantity of ammonia or amine equivalent to approximately about 10 times the unreacted isocyanate in the microcapsules. The action of the present post-treatment is operable over a wide range of molar ratios. The molar ratio of the reactants, ammonia or amine, to unreacted isocyanate groups in the post-treatment can range from about 1:1 to about 10:1, preferably about 5:1 to about 10:1. The pH can then be adjusted to the desired level. In certain instances, it is desirable to adjust the pH to a value below 7 to prevent hydrolytic decomposition of the core material. According to this system, after treatment with ammonia or amine, the pH can be adjusted to a value below about 7 and storage can take place without generation of carbon dioxide gas.

It should be noted that it is not necessary to separate the capsules for desired utilization following the post-treatment according to the instant invention. That is, the encapsulated material may be directly usable, depending upon the intended utilization. However, such separation prior to utilization may be carried out by any of the normal separation processes involving, for example, settling, filtration or skimming of the collected capsules, washing, and if desirable, drying. The product from the process of this invention is particularly suitable for direct agricultural pesticidal applications, additional agents can be added such as thickeners, biocides, surfactants and dispersants to improve stability and ease of application. Initial dispersion of the organic phase and the aqueous phase may be assisted with an appropriate emulsifying or dispersing agent and the control of the size and uniformity of the ultimate capsule is readily effected by any convenient method to disperse one liquid into another.

Improved polyurea microcapsules prepared in accordance with the new method of post-treatment with ammonia or an amine of the present invention is further illustrated, but not limited, by the following examples.

EXAMPLE I

The use of post-treatment of the process of the present application for polyurea microcapsules with ammonia or amines to reduce residual isocyanate levels, was carried out with polyurea microcapsules of SUTAN® (S-ethyl diisobutyl thiocarbamate). The purpose was to prepare polyurea microcapsules including a core material and to treat said microcapsules with ammonia or an amine and to eliminate or substantially decrease the generation of gaseous carbon dioxide at pH values lower than about 7. This was to determine the storage capabilities of flowable formulations of polyurea microcapsules stored at pH values at less than about 7.

Microcapsules were typically prepared as follows: Water (2104 g.) containing 2.0 percent of neutralized poly-(methyl vinyl ether/maleic anhydride) protective colloid and 0.2 percent linear alcohol ethoxylate emulsifier was placed into an open reactor vessel. In a separate container, 1398 grams S-ethyl diisobutyl thiocarbamate (an herbicide), 165.4 grams of polymethylene polyphenylisocyanate (PAPI) and 82.7 grams toluene diisocyanate (TDI 80% 2,4 and 20% 2,6) were mixed together. This mixture was then added to the reactor vessel and emulsified with a high shear stirrer. The resulting particle range was about 5 to about 30 microns. Only mild agitation was required for the balance of the reaction. The temperature of the reaction was raised 50° C. over a 20 minute period. The temperature was maintained at 50° C. for about 3 hours.

The polyurea microcapsule dispersion was then divided into portions. A quantity of ammonia or an amine equivalent to 10 times the unreacted isocyanate in the microcapsules was added to each portion. The pH was then adjusted. Each portion was then heated to 50° C. for 6 hours. Then each portion was adjusted to pH 4.5 and placed in 500cc. stainless steel cylinders equipped with pressure gauges. These cylinders were stored at 110° F. (43.5° C.). Pressure readings were taken periodically for one month. The results of the pressure readings after 2 and 4 weeks are given in Table I.

TABLE I

STORAGE STABILITY - SUTAN®

(15% Wall; PAPI/TDI = 2.0)

| Post-Treatment | Pressure in Cylinders Stored at 110° F. (43.5° C.) psig; pH 4.5 | |
|---|---|---|
| | 2 Weeks | 4 Weeks |
| Untreated | 12.8 | 15.0 |
| 50° C., 6 hr., pH = 9.5 | 9.5 | 14.0 |
| 3.2% dibutylamine, 50° C., 6 hr., pH = 9.9 | 1.5 | 1.5 |
| 0.5% $NH_3$, 50° C., 6 hr., pH = 9.6 | 0 | 1.7 |
| 1.8% diethylamine, 50° C., 6 hr., pH = 11.1 | 2.0 | 3.0 |
| 2.4% dipropylamine, 50° C., 6 hr., pH = 11.2 | 1.6 | 2.2 |

The post-treatment of the polyurea microcapsules with ammonia or amines was effective in reducing the residual isocyanate levels as evidenced by the reduced carbon dioxide pressure in the cylinders.

EXAMPLE II

Post-treatment of the polyurea microcapsules with ammonia as especially effective in reducing the residual isocyanate levels in polyurea capsules containing methyl parathion. Since methyl parathion is susceptible to hydrolytic decomposition at pH values greater than about 7, storage of these microcapsules at lower pH values is required. Therefore, treatment with ammonia after the formation of the polyurea microcapsules is extremely valuable.

When methyl parathion microcapsules are stored at pH 11.0 for six weeks at 110° F. (43.5° C.), 13 percent methyl parathion decomposition resulted. Storage at low pH was considered in order to overcome the decomposition problem. However, when the microcapsules were stored at low pH (4.5), 23 psig, carbon dioxide pressure was produced from residual isocyanate reaction with water. However, if the capsules are post-treated with ammonia and then stored at pH 4.5, there is no decomposition of the methyl parathion and only about 3.5 psig developed from the hydrolysis of any residual isocyanate.

EXAMPLE III

Each of the following organo phosphorus insecticides were microencapsulated:

(DYFONATE®) O-ethyl S-phenyl ethylphosphorodithioate and

O-ethyl-S-parachlorophenyl ethylphosphorodithioate

The microcapsule formulations were typically prepared in polyurea microcapsules.

Polyurea microcapule samples of O-ethyl-S-parachlorophenyl ethylphosporodithioate (10–30 u; 7.5% wall; PAPI/TDI = 2.0) were prepared from PAPI (polymethylene polyphenylisocyanate) and TDI (toluene diisocyanate monomers). The preparation steps were similar to those of Example I, supra. In one sample (32-2), the reaction mass was heated at 60° C. for 2 hours and then 0.5% ammonia was added, the pH was adjusted to 7.0 with hydrochloric acid. Heating was continued at 60° C. for 1 additional hour. In a second sample (30-1), no ammonia was added. The reaction mass was heated at 60° C. for 3 hours.

Microcapsules of O-ethyl S-phenyl ethylphosphorodithioate were similarly prepared. Sample (13-1) no post-ammonia treatment; sample (18) post-ammonia treated.

The post-treated capsules and untreated capsules were used as microcapsule formulations and bioassayed for foliar insecticidal activity and toxicology against salt-marsh caterpillar and acute oral $LD_{50}$ (mg/kg) on female rats.

The following test procedures were used.

1. Leaf Dip Assay on Second Instar Salt-Marsh Caterpillar Larvae [*Estigmene acrea* (Drury)].

Test formulations are diluted in water. Sections of curly dock (*Rumex crispus*) leaves, approximately 1 × 1.5 inches, are immersed in the test solutions for 2-3 seconds and placed on a wire screen to dry. The dried leaves are placed in Petri dishes containing a moistened piece of filter paper and infested with five second-instar salt-marsh larvae. Test concentrations range from 0.05% down to that at which approximately 50% mortality occurs.

2. Direct Spray Assay on Second Instar Salt-Marsh Caterpillar Larvae.

Test solutions were prepared using the above microcapsule formulation. Second instar salt-marsh caterpillar larvae were placed on filter paper and sprayed, using a linear spray table. The volume of spray used was equivalent to 80 gallons/acre such that the active ingredient per acre would be 1, 0.5, 0.25, 0.125, etc. After spraying, the larvae were placed in Petri dishes with moist filter paper and synthetic media. The mortality was determined after three days. The $LD_{50}$ value determined by usual means at which approximately 50% mortality occurred.

TABLE II

FOLIAR INSECTICIDAL ACTIVITY AND TOXICOLOGY FOR O-ETHYL-S-PARACHLOROPHENYL ETHYLPHOSPHORODITHIOATE MICROCAPSULE FORMULATIONS

| Formulation | Direct Spray Salt-Marsh Caterpillar $LD_{50}$ Values | Leaf Dip Assay Salt-Marsh Caterpillar $LD_{50}$ Values | Acute Oral $LD_{50}$ (mg/kg) (Female Rats) |
|---|---|---|---|
| 30-1 (Microcapsule) without ammonia post-treatment | 1 lb. a.i./A | .004% | 316 |
| 32-2 (Microcapsule) with ammonia post-treatment | 1/8 – 1/4 lb a.i./A | <.001% | 14.7 |
| (Emulsifiable concentrate | <1/8 lb a.i./A | <.001% | 1.7 |

TABLE III

FOLIAR INSECTICIDAL ACTIVITY AND TOXICOLOGY FOR O-ETHYL S-PHENYL ETHYLPHOSPHORODITHIOATE MICROCAPSULE FORMULATIONS

| Formulation | Direct Spray Salt-Marsh Caterpillar $LD_{50}$ Values | Acute Oral $LD_{50}$ (mg/kg) (Female Rats) |
|---|---|---|
| 13-1 (Microcapsule) without ammonia post-treatment | > 1 lb a.i./A | 3160 |
| 18 (Microcapsule) with ammonia post-treatment | 1/4 lb a.i./A | 31.6 |
| (Emulsifiable concentrate) | <1/4 lb a.i./A | 10 |

It appears that the addition of ammonia stops the cross-linking reaction by reacting with any residual isocyanate groups. Therefore, the active ingredients are able to permeate through the capsule wall which has been treated with ammonia more readily than through the untreated capsule wall. Hence, the greater direct spray and leaf dip activity with the ammonia treated sample.

As is apparent from the foregoing specification, the method of the present invention is susceptible of being embodied with various alterations and modifications which may differ particularly from those that have been described in the preceding specification, examples and description. For this reason, it is to be fully understood that all of the foregoing is intended to be merely illustrative and is not to be construed or interpreted to be restrictive or otherwise limiting of the present invention, excepting as it is set forth and defined in the hereto appended claims.

What is claimed is:

1. Method of reducing residual isocyanate level in polyurea microcapsules comprising post-treatment of said polyurea microcapsules with an excess of ammonia or an amine.

2. The method of claim 1 in which said amine is an organic dialkylamine wherein said alkyl groups each contain from 1 to 6 carbon atoms, inclusive.

3. The method of claim 1 in which said post-treatment is with ammonia.

4. In the process of microencapsulation of core material by interfacial polymerization of an organic isocyanate intermediate, the improvement comprising post-treating formed polyurea microcapsules with an excess of ammonia or an amine.

5. In the process of claim 4 in which post-treatment is with an excess of an amine which is an organic dialkylamine wherein said alkyl groups each contain from 1 to 6 carbon atoms, inclusive.

6. In the process of claim 4 in which said post-treatment is with an excess of ammonia.

7. Improved polyurea microcapsules having reduced residual isocyanate levels and modified permeability of the microcapsule wall prepared by post-treatment of the formed polyurea microcapsules with an excess of an amine or ammonia.

8. Improved polyurea microcapsules of claim 7 in which said post-treatment is with an excess of an amine which is an organic dialkylamine wherein said alkyl groups each contain from 1 to 6 carbon atoms, inclusive.

9. Improved polyurea microcapsules of claim 7 in which said post-treatment is with an excess of ammonia.

* * * * *